United States Patent [19]

Akamatsu et al.

[11] 3,839,171

[45] Oct. 1, 1974

[54] UNSATURATED POLYESTERS AND LAMINATES THEREOF

[76] Inventors: Kiyoshi Akamatsu, Tokyo; Takeaki Hagihara, Saitama-Ken; Teruhisa Ishido, Tokyo, all of Japan; Asahi Kasei Kogyo Kabushiki Kaisha, 03, Osaka, Japan

[22] Filed: Mar. 24, 1972

[21] Appl. No.: 237,980

Related U.S. Application Data

[63] Continuation of Ser. No. 797,250, Feb. 6, 1969.

[30] Foreign Application Priority Data

Feb. 15, 1968 Japan .................................. 43-9146

[52] U.S. Cl. ............ 204/159.15, 161/182, 161/195, 161/205, 161/214, 161/233, 161/227, 161/270, 161/247, 204/159.18, 204/159.19, 260/45.75 C, 260/45.8 SN, 260/45.9 R, 260/45.95, 260/862, 260/863, 260/864, 260/865, 260/866, 260/872

[51] Int. Cl. ............................ C08d 1/00, C08f 1/00

[58] Field of Search .................. 204/159.15, 159.23; 260/863, 864, 865, 809, 872

[56] References Cited

UNITED STATES PATENTS

| | | | |
|---|---|---|---|
| 2,921,006 | 1/1960 | Schmitz et al. | 204/159.15 |
| 3,203,802 | 8/1965 | Burg | 204/159.18 |
| 3,485,733 | 12/1969 | D'Alelio | 204/159.15 |
| 3,558,387 | 1/1971 | Bassemir et al. | 240/159.15 |

*Primary Examiner*—Paul Lieberman
*Assistant Examiner*—Richard B. Turer
*Attorney, Agent, or Firm*—Burgess, Dinklage & Sprung

[57] ABSTRACT

A photopolymerizable composition comprising:

I. an unsaturated polyester having an average molecular weight of about 1,500 to 50,000, containing in the molecule at least one weight percent of a segment, measured from one ester bond to the next ester bond, having a molecular weight of about 80 to 5,000, and containing about $2 \times 10^{-3}$ to $2 \times 10^{-4}$ mole of ethylenic unsaturation per gram of unsaturated polyester;

II. about 10 to 80 weight percent of at least one ethylenically unsaturated monomer, different from the polyester (I), which is addition-copolymerizable with the polyester (I); and III. about 0.001 to 10 weight percent of a photopolymerization initiator.

This photopolymerizable composition is disposed between two articles to be laminated, which articles have had their facing surfaces subjected to actinic radiation before photopolymerization, and then photopolymerized. The lamination may be of more than two articles, in which case the photopolymerizable composition is disposed between each adjacent pair of articles. The articles being laminated may be plastic, wood, metal, ceramic, stone, glass, etc.

18 Claims, No Drawings

UNSATURATED POLYESTERS AND LAMINATES THEREOF

This is a continuation of application Ser. No. 797,250 filed Feb. 6, 1969.

This invention relates to laminated articles such as laminated safety glass and other multilayer articles. It more particularly refers to novel compositions which are photopolymerizable by the action of actinic light which are useful compositions for interlayers of laminated articles.

Heretofore, in order to bond plastics, wood, metals or ceramics, there have been used, as adhesive interlayers, thermosetting adhesives such as phenol resins, epoxy resins or urethane resins; thermoplastic adhesives such as polyvinylacetates, vinyl chloride resins, polyacrylonitriles, polymethacrylates or polyvinylbutyrals; and rubber adhesives such as natural rubbers or synthetic rubbers. These known adhesives can be characterized as voltatile solvent types; melt types, thermally decomposing radical polymerizable types or thermally reactive types having a reaction mechanism initiated by the action of heat energy and accompanied by a remarkable amount of auto-generation of heat. In the bonding of plates or sheets having a large area, when a thermoplastic or rubber adhesive of volatile solvent type is used, it is very difficult to completely remove the solvent by volatilization and the remaining solvent weakens the bonding, causes foaming of the interlayer and lowers the weather resistance of the product. The adhesives of this type cannot form thick interlayers and the laminated articles made therefrom break because of their incapability of absorbing the thermal expansion of the adherents caused by temperature differential of the ambient environment. When a thermoplastic resin adhesive of melt-type is used, it is required to heat it above the softening point of the resin in order to obtain the necessary workability and bonding. Due to a difference of thermal contractibility between the adherents after cooling, there is distortion and a lowering of bonding strength among adherents and interlayers. Accordingly, these plastics are less than satisfactory for use as adherents. According to this known method, bonding is accomplished at an elevated temperature and it takes a considerable time to gradually cool the laminated articles after the bonding. Furthermore, in order to improve the workability it is necessary to lower the softening point of this kind of adhesive and the thus produced laminated articles inevitably have a temperature dependency limitation. When a thermosetting adhesive is used, a remarkable amount of heat is generated by the curing and bonding reaction and foaming is induced by the volatilizations of the byproducts. These lower the bonding strength and result in opaque laminated articles unless the heating and pressure is sufficient to overcome the opacifying tendency. The pot life of adhesives of this type is short after mixing with a catalyst and, in contrast to this short pot life, the curing time is very long. In order to continuously produce an interlayer from this type of resin, it has been attempted to pour various kinds of alkyd resins or urethane resins between two sheets of glass, but interlayers from these resins are dull, poor in workability and brittle below room temperature, and always involve foaming of by-products because of their thermal reactivity. The safety glass thus produced is unfit for practical purposes.

In the production of safety glass, a desirable interlayer may be cured and bonded to two sheets of glass without using a solvent or without by-producing a volatile product. Heretofore the bonding strength has been increased by heating as mentioned above, but such safety glass tends to break unless it is cooled gradually after heating. It is desired to bond an interlayer to two sheets of glass at room temperature. The interlayer resin used is required to have a small contractibility upon curing.

On the other hand, when a thermoplastic resin is used as an interlayer, such should be heated to above the softening point of the resin in order to provide appropriate workability and bonding. When a thermosetting resin is used as an interlayer, the curing reaction is accompanied by a remarkable generation of heat. Furthermore, when an inorganic salt is used, elevated temperature processing at at least 300° C. is necessary. Thus, laminated safety glass using a known resin interlayer cannot escape a thermal expansion of glass and the interlayer.

Accordingly, in the production of laminated articles in general and especially in the production of laminated safety glass, it has been found to be desirable to use such adhesives as will bond a large area of interlayer to adherents at room temperature in a short time while being able to arbitrarily vary the thickness of the interlayer without using a solvent or without by-producing a volatile compound.

Laminated safety glass has been produced by inserting an organic plastic sheet between two sheets of glass and bonding the organic plastic sheet to the two sheets of glass. Remarkably complicated and time-consuming processes are necessary to bond such interlayer to two sheets of glass uniformly without distortion. Polyvinylbutyrals are often employed as the organic plastic sheet in the production of laminated safety glass. Firstly, a film of polyvinylbutyral, of 0.2 mm. to 1.0 mm. is prepared, washed and dried to have a moisture content of up to about 0.5 percent. Secondly, the dried film of polyvinylbutyral is inserted between two sheets of glass and subjected to a preheating and defoaming process by pressing at about 100° C. Thirdly, the laminated glass thus produced is subjected to a heating process in an autoclave at a pressure of 10 Kg./cm$^2$. to 15 Kg./cm$^2$ at a temperature of 120° to 150° C. This process takes about 2 hours and is carried out batch-wise. It is impossible to combine the production of laminated safety glass with a continuous process of producing glass plates. Consequently the applications of laminated safety glass are limited to the high cost and special field and do not extent to glass for general use, for example, for domestic use.

A laminated article having a large area composed of adherents having a different thermal expansibility, e.g. glass and a plastic or a metal, warps by an expansion or contraction caused by a temperature difference of environments. However, the interlayers of laminated articles are required to have a toughness and elasticity sufficient to absorb the thermal expansion of the adherents. A laminated safety glass having the same adherents of a low thermal expansibility is not influenced by thermal warping and distortion to as great an extent, but is required to have a penetration resistance by way of precaution against collision accidents as well as an increased toughness and elongation.

It is an object of this invention to provide a novel interlayer material which is particularly useful in the production of laminated articles, particularly laminated safety glass.

Another object of this invention is to provide a novel interlayer material which substantially avoids the difficulties of prior art interlayer materials.

Other and additional object of this invention will become apparent from a consideration of this entire specification and claims.

In accord with and fulfilling these objects, one aspect of this invention resides in a photopolymerizable composition comprising:

I. an unsaturated polyester polymer having an average molecular weight of about 1,500 to 50,000, containing in the molecule at least one weight percent of a segment, measured from one ester bond to the next adjacent ester bond, having a molecular weight of about 80 to 5,000 and containing about $2 \times 10^{-3}$ to $2 \times 10^{-4}$ moles of ethylenic unsaturation per gram of unsaturated polyesterpolymer;

II. about 10 to 80 weight percent, based upon the total weight of the composition, of at least one ethylenically unsaturated monomer, different from the polyester polymer (I), which is addition-copolymerizable with the polyester polymer (I); and III about 0.001 to 10 weight percent of a photopolymerization initiator.

It has now been found that by using such photopolymerizable composition, mainly comprising an unsaturated polyester, as one or more interlayers of laminated articles, such laminated articles may be produced in a simple and short-time operation by exposing an assembly of at least two layers of adherents and at least one interlayer of this photopolymerizable composition to actinic light at room temperature without any solvent or heating. The capability of absorbing thermal expansion and the penetration resistance of laminated articles depend upon the toughness and elongation of the interlayers which in turn is related to the concentration of polar groups constituting the segments of the unsaturated polyester, especially the ester-bond having the highest concentration among the segments. In order to provide sufficient toughness and elongation to the interlayer, the photopolymerizable composition of this invention comprises an unsaturated polyester containing in the molecule at least one per cent by weight of a segment having a molecular weight of 80 to 5,000 of one ester-bond to the next adjacent ester-bond.

Another aspect of this invention resides in the cross-linked polymerization product of the composition described herein. This cross-linked polymerization product is an excellent interlayer for laminated articles as noted herein.

Still another aspect of this invention lies in the production of a laminated article, suitably laminated safety glass, by exposing the articles to be laminated and at least one interlayer of the composition set forth above to actinic radiation, assembling the structure with at least one interlayer disposed between next adjacent articles being laminated together (adherents). It is within the scope of this invention to provide one, two or perhaps three or more interlayers between adherents, but one or two interlayers are preferred. It is within the scope of this invention to adhere together and laminate more than two adherents. In this case there are provided at least one interlayer between each next adjacent adherent. After the structure of adherents and one or more interlayers is assembled, the interlayer is polymerized and the lamination of the adherents is complete.

According to a still further aspect of the present invention a laminated article is provided comprising at least two adherent layers bonded to at least one photopolymerized interlayer, said interlayer being, before photopolymerization, a photopolymerizable composition mainly comprising (I) an unsaturated polyester, (II) at least one ethylenically unsaturated monomer addition-copolymerizable with said polyester and (III) a photopolymerization initiator, said unsaturated polyester containing in the molecule at least one percent by weight of a segment having an average molecular weight of 80 to 5,000 and having an average molecular weight of 1,500 to 50,000 and an olefinic double bond concentration of $2 \times 10^{-3}$ to $2 \times 10^{-4}$ mole per gram and the assembly of said adherents and said interlayer before being exposed to actinic light.

The photopolymerized interlayers derived from the photopolymerizable compositions of this invention bonded to adherents have a rubber-like elasticity and completely absorb a thermal expansion of adherents and an impact and may be bonded to adherents so as to glide between the adherents. When a photopolymerizable composition mainly comprises an unsaturated polyester containing in the molecule a segment having a molecular weight of one ester-bond to another ester-bond below 80, the photopolymerized interlayers are rigid and brittle and have neither the penetration resistance nor the absorbability of thermal expansion required for laminated articles. The term "a molecular weight of one ester-bond to another ester-bond" represents a molecular weight of a segment from one ester-bond to the next successive ester-bond. The segment content is given by the following formula:

Content (percent by weight)

$$= \frac{\sum_{i=1}^{i} ME_i n_i}{\sum_{i=1}^{i} ME_i n_i + \sum_{j=1}^{j} mE_j m_j + 44 \left( \sum_{j=1}^{i} n_i + \sum_{j=1}^{j} mj \right)}$$

$ME_i$ : Molecular weight of $i$ kinds of segments of one ester-bond to another ester-bond of 80 up to 5,000 in the molecule of an unsaturated polyester.

$n_i$ : Mole number of $ME_i$.

$mEj$ : Molecular weight of $j$ kinds of segments of one ester-bond to another ester-bond below 80 in the molecule of an unsaturated polyester and above 5,000 in the molecule of an unsaturated polyester.

$m_j$ : Mole number of $mE_j$.

The polyols which gives a segment having a molecular weight of one ester-bond to another ester-bond of 80 to 5,000 in an unsaturated polyester [hereinafter referred to as ($a$)] are preferably alkyleneglycols of the formula $HO\text{-}(CH_2)_n\text{-}OH$ wherein $n$ is an integer of 6 to 10, polyoxyethyleneglycols of the formula, $HO\text{-}(CH_2\text{-}CH_2O)_m\text{-}H$ wherein $m$ is an integer of 3 to 110, polyoxypropyleneglycols of the formula, $$HO-\left(CH_2-\underset{\displaystyle CH_3}{\underset{|}{C}H}-O\right)_p-H$$

wherein $p$ is an integer of 2 to 86, copolymers of ethylene oxide with propylene oxide having an average molecular weight of 200 to 5,000, polyoxytrimethyleneglycols of the formula, HO-($CH_2$-$CH_2$-O)$q$-H wherein $q$ is an integer of 2 to 86, polyoxytetramethyleneglycols of the formula, HO-($CH_2$-$CH_2$-$CH_2$-$CH_2$-O)$_r$-H wherein $r$ is an integer of 2 to 65, glycerinpropylethertriol monolaurate, glycerinpolyoxypropylethertriols of the formula,

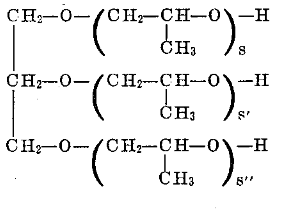

wherein S, S' and S'' represent an integer of 1 to 50 and mono-methyl, -ethyl or -propyl esters thereof, trimethylolpropane-propylethertriol monooleate, hydroxyl-terminated polystyrenes having an average molecular weight of 100 to 5,000, hydroxyl-terminated polybutadienes having an average molecular weight of 100 to 5,000, hydroxyl-terminated polyethylenes having an average molecular weight of 100 to 5,000 and hydroxyl-terminated polypropylenes having an average molecular weight of 100 to 5,000.

Examples of suitable di-or triols which may be included in the unsaturated polyesters [hereinafter referred to as (*b*)] are ethylene glycol, dioxyethylene glycol, propylene glycol, trimethylene glycol, tetramethylene glycol, pentamethylene glycol, glycerol and trimethylolpropane.

The dicarboxylic acids which give a segment having a molecular weight of one ether-bond to another ether-bond of 80 to 5,000 [hereinafter referred to as (*c*)] include suberic acid, azelaic acid, sabacic acid, *p,p'*-biphenyldicarboxylic acid, bis (*p*-carboxyphenyl)methane, 1,2-bis(*p*-carboxyphenyl ethane, 1,4-bis(*p*-carboxyphenyl)butane, 1,3-bis(*m*-carboxyphenyl) propane, 1,2-bis(*p*-carboxyphenoxy) ethane, 1,4-bis(*m*-carboxyphenoxy)butane 1,5-naphthalene dicarboxylic acid, 2,6-naphthalene dicarboxylic acid, 2,7-naphthalene dicarboxylic acid and dimethyl or diethyl esters thereof.

Exemplary unsaturated dicarboxylic acids, anhydrides and methyl or ethyl esters thereof utilized for the preparation of an nsaturated olyester [hereinafter referred to as (*d*)] include maleic acid, fumaric acid, citraconic acid, mesaconic acid, itaconic acid, glutaconic acid, muconic acid, aconitic acid and dimethyl or diethyl esters thereof, maleic anhydride, citraconic anhydride and itaconic anhydride.

Examples of suitable saturated carboxylic acids, anhydrides and methyl or ethyl esters thereof which can be used for modifying an unsaturated polyester hereinafter referred to as (*e*), include succinic acid, glutaric acid, adipic acid, isophthalic acid, terephthalic acid, dimethylesters, diethylesters, diethylesters thereof and phthalic anhydride.

In order to improve the tensile strength and elasticity of an interlayer of laminated articles, a part of the unsaturated dicarboxylic acids, anhydrides or methyl or ethyl esters utilized for the preparation of such unsaturated polyester containing segments having a molecular weight of one ester-bond to another ester-bond of 80 to 5,000 may be replaced by a saturated carboxylic acid, anhydride or methyl or ethyl ester thereof to vary the ethylenic double bond concentration in the unsaturated polyester. The term "double bond concentration" means the mole number of ethylenic double bonds per 1 g. of the unsaturated polyester polymer. The ethylenic double bond concentration is preferably in the range of $2 \times 10^{-3}$ mole/gram to $2 \times 10^{-4}$ mole/-gram. With ethylenic double bond concentrations above $2 \times 10^{-3}$ mole/gram, an interposed layer of laminated articles tends to become so hard and so low in elasticity that the laminated articles exhibit a remarkably low penetration resistance and absorbability of thermal expansion. On the other hand when the ethylenic double bond concentration is below $2 \times 10^{-4}$ mole/gram, the photopolymerizable compositions do not give sufficiently cross-linked, net-work polymers after polymerization and the tensile strength of such interlayer becomes low. When the ethylenic double bond concentration is in the range of $2 \times 10^{-3}$ mole/gram to $2 \times 10^{-4}$ mole/gram, the photopolymerizable compositions give adequately cross-linked, net-work, infusible, heat-resistance polymers after photopolymerization and the tensile strength and elasticity of the interlayer are greatly improved. Also the temperature dependency of such an interlayer becomes very small.

The unsaturated polyesters containing a segment having a molecular weight, measured from one ester-bond to another ester-bond, of 80 to 5,000, i.e., the first component of the photopolymerizable compositions, can be produced by conventional processes. Usually an unsaturated polyester is formed by direct esterification, ester exchange or addition reaction:

1. between a polyol (*a*) and an unsaturated dicarboxylic acid (*d*) with, if desired, a dicarboxylic acid (*c*) and/or a saturated carboxylic acid (*e*);

2. between a polyol (*a*) and a di-or triol (*b*) and an unsaturated dicarboxylic acid (*d*) with, if desired, a dicarboxylic acid (*c*) and/or a saturated carboxylic acid (*e*); and 3. between a di-or triol (*b*) and an unsaturated dicarboxylic acid (*d*) and a dicarboxylic acid (*c*) with, if desired, a saturated carboxylic acid (*e*).

It is preferred to use unsaturated polyester polymers having an average molecular weight of 1,500 to 50,000. When the average molecular weight of the unsaturated polyesters is below 1,500, a balance between the ethylenic double bond concentration after photopolymerization and the molecular weight is lost so as not to result in a net-work structure and the elasticity of interlayers is completely lost. On the other hand the preparation of unsaturated polyesters having an average molecular weight about 50,000 becomes difficult and photopolymerizable compositions comprising such high molecular weight unsaturated polyesters are viscous and have remarkably insufficient workability.

As the second component of the photopolymerizable compositions of this invention exemplary ethylenically unsaturated monomers include:

A. compounds of one of the three following general formulae;

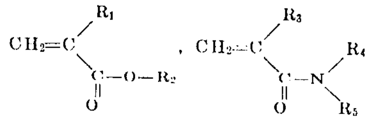

and

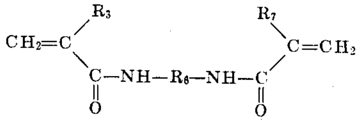

wherein $R_1$ represents a hydrogen atom, chlorine atom or methyl group; $R_2$, $R_3$ and $R_7$ represent independently hydrogen atoms or methyl groups and $R_2$ represents a hydrogen atom in case of $R_1$ being hydrogen atom; $R_4$ represents a hydrogen atom, methyl or ethyl group; $R_5$ represents a hydrogen atom, a $-C_mH_{2m+1}$ group wherein $m$ is an integer of 1 to 6, a cyclohexyl group, a $-(CH_2)_n$-OH group, wherein $n$ is an integer of 1 to 5, a $-CH_2)_p$ $-O-C_qH_{2q+1}$ group, wherein $p$ is an integer of 1 to 2 and $q$ is an integer of 1 to 5 or a $-CH_2-CH{=}CH_2$ group; and $R_6$ represents a $-(CH_2)_r-$ group, wherein $r$ is an integer of 1 to 10;

B. compounds of one of the following two general formulae:

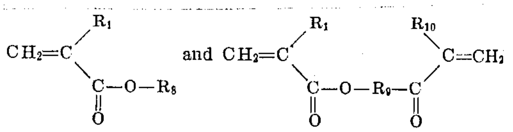

wherein $R_1$ and $R_{10}$ each represent a hydrogen atom, chlorine atom or methyl group; $R_8$ represents a $-C_sH_{2s+1}$ group, wherein $s$ is an integer of 2 to 15, a

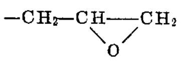

group, a

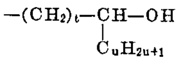

group wherein $t$ is an integer of 1 to 2 and $u$ is an integer of 1 to 5, a

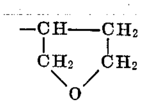

group, a $-CH_2-CH{=}CH_2$ group, or a $-(CH_2-CH_2-O)_v$-H group wherein $v$ is an integer of 1 to 15 and wherein $R_8$ represents a methyl group when $R_1$ is a hydrogen atom; $R_9$ represents a $-(CH_2-CH_2-O)_w-$ group wherein $w$ is an integer of 1 to 15;

C. aromatic compound having at least one

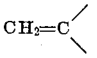

group and one benzene nucleus; and

D. other ethylenically unsaturated compounds.

Examles of suitable compounds (A) include acrylic acid, alpha-chloracrylic acid, methacrylic acid, methylmethacrylate, methylalphachloroacrylate, acrylamide, methacrylamide, N,N-dimethylacrylamide, N-isopropylacrylamide, N-hexyacrylamide, N-cyclohexylacrylamide, N-methylolacrylamide, N-ethylolacrylamide, N-amylolacrylamide, N-allyalacrylamide, N,N'-methylene bisacrylamide, N,N'-trimethylenebisacrylamide, N,N'-hexamethylenebisacrylamide, N,N'-decamethylenebisacrylamide, N-methoxyethylacrylamide, N-methylmethacrylamide, N-allylmethacrylamide, N-methylolmethacrylamide, N,N'-methylenebismethacrylamide and N-ethoxyethylmethacrylamide.

Examples of suitable compounds (B) include methyl acrylate ethyl acrylate, *n*-butyl acrylate, isobutyl acrylate, *n*-propyl acrylate, isopropyl acrylate, 2-ethylhexyl acrylate, *n*-octyl acrylate, *n*-decyl acrylate, *n*-tetradecyl acrylate, allyl acrylate, furfuryl acrylate, glycidyl acrylate, *n*-butyl methacrylate, isobutyl methacrylate, 2-ethylhexyl methacrylate, lauryl methacrylate, furfuryl methacrylate, diethyleneglycol diacrylate, tetraethyleneglycol diacrylate, ethyleneglycol monomethacrylate, diethyleneglycol monoacrylate, hexamethyleneglycol dimethacrylate, tetradecylethyleneglycol dimethacrylate, 2-hydroxyethyl methacrylate, 2-hydroxypropyl methacrylate, 2-hydroxyhexyl methacrylate, and glycidylmethacrylate.

Examples of suitable compounds (C) include styrene, divinylbenzene, alpha-methylstyrene, vinyltoluene, alpha-chlorostyrene, vinylchlorobenzene, vinylphenol, aminostyrene, vinylbenzoic acid, methoxystyrene, allylbenzene, diallylbenzene, allyltoluene, monoallylphthalate and diallylphthalate.

Examples of suitable other ethylenically unsaturated compounds (D) include 1,3-butadiene, 2-chlorobutadiene, 2-methylbutadiene, allylalcohol, allylacetate, vinylacetate, vinylpropionate, maleic acid, fumaric acid, itaconic acid, dimethyl maleate, diethyl maleate, dimethyl fumarate, diethyl fumarate, dimethyl itaconate, diethyl itaconate, cinnamic acid, ethylvinylether, propylvinylether, methylvinylketone, acrolein, vinylidene chloride, vinylpyridine, vinylpyrrolidone, diethylvinylamine, vinylcarbazole and triallycyanurate.

In order to improve the mechanical strength of the photopolymerized interlayers of laminated articles, it is preferred to employ at least one of said compounds (A) in an amount of at least 5 percent of the total weight of the ethylenically unsaturated monomers. When the amount is less than 5 percent, such does not significantly change the mechanical strength of the polymer after photopolymerization.

In order to improve the elongation of the photopolymerized interlayers, it is preferred to employ at least one of said compounds (B) in an amount of at least 5 percent of the total weight of the monomers. When the amount of compounds (B) is less than 5 percent, the elongation of the polymer after photopolymerization does not increase.

Further, in order to improve the transparency of the photopolymerized interlayer, it is preferred to employ at least one of said aromatic compounds (C) in an amount of at least 1 percent of the total amount of the ethylenically unsaturated monomers. When the amount of compounds (C) is less than 1 percent, the transparency of the polymer after photopolymerization does not increase.

Still further, in order to improve the properties of the photopolymerized interlayers, the mixture of ethylenically unsaturated monomers may comprise any two or three of said compounds (A), said compounds (B) and said aromatic compounds (C). When a mixture of two different types of monomers is used, i.e., (A), (B); (A), (C); or (B), (C) it is preferred to use (B) or (C) in amounts of at most 90 percent of the total weight of the monomer mixture. When a mixture of three types of monomers is used, it is preferred to employ the third compound (C) in amounts of at most 80 percent of the total amount of the monomer mixture.

The unsaturated polyesters according to the present invention can be photopolymerized with the aforesaid ethylenically unsaturated compound with the use of a known photopolymerization initiator.

Examples of suitable such known photopolymerization initiators include benzoins such as benzoin, alpha-methylbenzoin, benzoin methyl ether, benzoin ethyl ether, alpha-phenylbenzoin, alpha-allylbenzoin; phenones such as acetophenone, benzophone; anthraquinones such as anthraquinone, chloroanthraquinone, methylanthraquinone, tertbutylanthraquinone; peroxides such as benzoyl peroxide, methylethylketone peroxide, potassium persulfate; disulphides such as diphenyl disulphide, tetraethylthiuram disulphide; diketones such as benzil, diacetyl; aranyl salts such as uranyl nitrate, uranyl propionate; 2-naphthalene sulfonyl chloride; metal halides such as silver chloride, silver bromide, stannic chloride, stannous chloride and titanium chloride.

These photopolymerization initiators are preferably used in an amount of from 0.001 to 10 percent by weight based upon the total weight of the photopolymerizable composition. When the amount of the photopolymerization initiator is less than 0.001 percent by weight, the photopolymerization reaction is greatly retarded and is too slow for practical commercial purposes. On the other hand, amounts of initiator of more than 10 percent by weight do not significantly increase the reaction and would be uneconomical.

Known stabilizers may be employed for the purpose of maintaining storage stability (shelf life) of the photopolymerizable compositions. Such stabilizers may be added when the components of a photopolymerizable composition are admixed or may be added to each component separately prior to admixing of the components.

Exemplary stabilizers include hydroquinone, monotertbuyl hydroquinone, benzoquinone, 2,5-diphenyl-*p*-benzoquinone, pyridine, phenothiazine, *p*-diaminobenzene, beta-naphthol, naphthylamine, pyrogallol, cuprous chloride and nitrobenzene. These stabilizers are added only for completely preventing polymerization reaction without the actinic radiation set forth above without restraining the photopolymerization reaction. Consequently the amount of the stabilizers may preferably be about 0.005 to 3.0 percent by weight of the total weight of the photopolymerizable composition.

The photopolymerizable compositions of this invention are readily photopolymerized by actinic radiation having wave lengths below 7,000 A, generally between 2,000 and 5,000 A. Practical sources of such actinic radiation include carbon arc lamps, super high pressure mercury lamps, high pressure mercury lamps, low pressure mercury lamps, UV fluorescent lamps, xenon lamps and sunlight.

Examples of suitable adherents for the photopolymerizable compositions of this invention include plastic adherents such as polyamides, polyvinylchlorides, polymethylmethacrylates or polystyrenes, metals or alloys such as aluminum, tin, zinc, magnesium, chromium, duralumin or stainless steel, ceramics such as glass, asbesto, silica, stones such as marble, and wood. These adherents are positioned and arranged in such a way that all interlayers can be exposed to actinic light.

The present invention is especially effective for the production of laminated safety glass among a variety of laminated articles.

For example, in preparing a laminated safety glass, a spacer of a desired thickness having an inlet for introducing a photopolymerizable composition and an air outlet is inserted between two sheets of glass and the photopolymerizable composition set forth herein is charged through the inlet. One or both sides of the glass sheets are exposed at room temperature for 1 to 20 minutes to a source irradiating actinic radiation at a distance of 5 cm. to 100 cm. By this simple operation the whole area of the interlayer is simultaneously cured without substantially any accompanying contraction and the interlayer is completely handed to the glass sheets by the end of curing (photopolymerization) to give a laminated safety glass. Simply, a laminated safety glass may be produced by placing a spacer of the desired thickness on a sheet of glass, charging a photopolymerizable composition thereto, placing a sheet of glass on the spacer and exposing the resulting assembly to a source irradiating actinic radiation onto one or both sides of the sheets of glass. According to the present invention a variety of laminated articles as well as laminated safety glass may be continuously produced.

This invention will now be illustrated by the following examples in which parts are all by weight unless expressly stated to contrary.

EXAMPLE 1

Under an atmosphere of nitrogen gas, 0.25 mole of propylene glycol, 0.25 mole of polyoxypropylene glycol having an average molecular weight of 300, 0.14 mole of maleic anhydride and 0.36 mole of sebacic acid were reacted at 180° C. for 6 hours under reduced pressure to produce an unsaturated polyester having an average molecular weight of 9,000 and an ethylenic double bond concentration of $5 \times 10^{-4}$ mole/gram. To 100 parts of the unsaturated polyester polymer thus obtained, there were added 20 parts of methacrylic acid, 20 parts of acrylamide, 20 parts of styrene, 1 part of diphenyldisulfide and 0.1 part of hydroquinone and these were thoroughly mixed to produce a photopolymerizable composition.

A spacer, 0.30 mm in thickness, having an inlet for introducing the photopolymerizable composition therethrough and an air outlet was inserted between 2 transparent glass sheets, each 3 mm. in thickness, respectively and the photopolymerizable composition was charged through the inlet. Both sides of the transparent glass sheets were exposed at room temperature for 5 minutes to 60 W ultra violet fluorescent lamps set at a distance of 10 cm from the glass to give a laminated safety glass. This laminated safety glass was subjected to Impact Test according to Japanese Industrial Standard (hereinafter abbreviated as JIS) R 3205. The laminated safety glass withstood the impact which was to drop a solid smooth steel ball weighting 225 g. from the height of 10 m. at a temperature of –30° to 50° C. Accordingly this laminated safety glass exhibited no temperature dependency. Also the quantity of glass fragments separated from the laminated safety glass at the time of impact was very small.

EXAMPLES 2 to 14

A variety of unsaturated polyesters set forth in Table I were prepared in the same manner as in Example 1. To 100 parts of the unsaturated polyester, there were added 50 parts of acrylic acid, 20 parts of styrene, 20 parts of butylacrylate, and 2 parts each of benzoin and p-diaminobenzene. These were throughly mixed to produce a photopolymerizable composition. Each resulting photopolymerizable composition was exposed for 10 minutes to 6 W. fluorescent lamps at a distance of 10 cm. and tensile strength and elongation of the photopolymerized article were measured. The results are shown in Table I. Using each resulting photopolymerizable composition, a laminated safety glass having an interlayer of 0.75 mm. was prepared in the same manner as in Example 1. All laminated safety glasses but the ones in Examples 2, 10 and 11, in which the unsaturated polyesters contained segments having a molecular weight from one ester-bond to another ester-bond below 80 were used, passed the tests according to American Standard Association (hereinafter abbreviated as ASA) Z 26-1-1966, i.e., Light Stability, Luminous Transmittance, Humidity, Boil, Impact (dart from 30 feet and ball from 30 feet), Deviation and Distortion, Abrasion Resistance and Penetration Resistance Tests. The laminated safety glasses in Examples 2, 10 and 11 did not pass the tests of Impact (dart and ball) and Penetration Resistance.

EXAMPLES 15 to 23

0.25 mole of polyoxytetramethyleneglycol having an average molecular weight of 200, 0.25 mole of dioxyethyleneglycol, 0.23 mole of maleic anhydride and 0.27 mole of adipic acid were polycondensed in the same manner as in Example 1 to obtain an unsaturated polyester having an average molecular weight of 12,000 and an olefinic double bond concentration of $1 \times 10^{-3}$ mole/gram. To 100 parts of the unsaturated polyester thus obtained, there were added a desired amount of a variety of ethylenically unsaturated compound shown in Table II and 2 parts of benzoin and these were thoroughly mixed to give photopolymerizable compositions. Each resulting photopolymerizable composition Table I

| Example No. | Alcoholic component (mole) | | Acidic component (mole) | | Ethylenic double bond concentration (mole/gram) | Average molecular weight | Tensile strength[1] | Elongation[2] |
|---|---|---|---|---|---|---|---|---|
| 2 | Ethyleneglycol | 0.50 | Maleic acid<br>Adipic acid | 0.15<br>0.35 | $2 \times 10^{-3}$ | 2,000 | B | A |
| 3 | Hexamethyleneglycol | 0.50 | do. | | $1 \times 10^{-3}$ | 2,900 | C | C |
| 4 | Ethyleneglycol<br>Polyoxyethyleneglycol (average molecular weight: 1,000) | 0.40<br>0.10 | do. | | $1 \times 10^{-3}$ | 19,000 | C | D |
| 5 | Ethyleneglycol<br>Polyoxypropyleneglycol (average molecular weight: 200) | 0.40<br>0.10 | do. | | $9 \times 10^{-4}$ | 7,500 | D | C |
| 6 | Ethyleneglycol<br>Copolymer of ethylene oxide with propylene oxide (1:2) (average molecular weight: 1,000) | 0.40<br>0.10 | do. | | $1 \times 10^{-3}$ | 10,000 | C | D |
| 7 | Ethyleneglycol<br>Polyoxypropyleneglycol (average molecular weight: 2,000) | 0.499<br>0.001 | Maleic acid<br>Adipic acid | 0.10<br>0.40 | $1 \times 10^{-3}$ | 10,000 | D | D |
| 8 | Ethyleneglycol<br>Hydroxy-terminated polybutadiene (average molecular weight: 2,000) | 0.30<br>0.20 | do. | | $2 \times 10^{-4}$ | 42,000 | C | D |
| 9 | Ethyleneglycol<br>Hydroxy-terminated polystyrene (average molecular weight: 1,000) | 0.40<br>0.1 | Maleic acid<br>Acipic acid | 0.10<br>0.40 | $5 \times 10^{-4}$ | 23,000 | C | C |
| 10 | Dioxyethyleneglycol | 0.50 | Fumaric acid<br>Succinic acid | 0.25<br>0.25 | $3 \times 10^{-3}$ | 3,200 | B | A |
| 11 | do. | | Fumaric acid<br>Phthalic anhydride | 0.25<br>0.25 | $2 \times 10^{-3}$ | 3,500 | B | A |
| 12 | do. | | Fumaric acid<br>Azelaic acid | 0.10<br>0.40 | $8 \times 10^{-4}$ | 4,300 | C | C |
| 13 | do. | | Fumaric acid<br>Sebacic acid | 0.10<br>0.40 | $8 \times 10^{-4}$ | 3,500 | C | C |
| 14 | do. | | Fumaric acid<br>Pimelic acid<br>1-4-bis(m-carboxyphenyl) butane | 0.10<br>0.30<br>0.10 | $7 \times 10^{-4}$ | 2,500 | D | D |

Conditions of measurement
[1] Tensile strength: ASTM D638-58T at 20°C.; A : 0–100 Kg./cm$^2$., B : 100–200 Kg./cm$^2$, C : 200–300 Kg./cm$^2$, D : >300 Kg./cm$^2$
[2] Elongation: ASTM D638-58T at 20°C.; A : 0–100%, B : 100–200%, C : 200–300%, C : >300% was exposed for 20 minutes to 60 W. fluorescent lamps at a distance of 10 cm. to photopolymerize such and then tensile strength, elongation and transparency of the products were measured. The results are shown in Table II.

An assembly composed of, as adherent, two sheets of polyvinylchloride having dimensions of 1 m. (length) x 1 m. (width) x 2 mm. (thickness) each and two sheets of glass having a dimension of 1 m. (length) x 1 m. (width) x 2 mm. (thickness) each and three interlayers of each resulting photopolymerizable compositions of 2 mm. in thickness each in which said adherents were arranged in an order of glass, polyvinylchloride, polyvinylchloride and glass, was exposed for 10 minutes to a 3 KW. three-core carbon arc lamp at a distance of 75 cm. to give a laminated article. The temperature of one side of the laminated article thus produced was constantly maintained at 0° C. while that of the other side was maintained alternately at 0° C. and at 60° C. in a period of 2 hours. This test was continued for 100 hours. All laminated articles except the one in Example 23 did not break and the interlayers neither broke nor peeled off. But the interlayers of the laminated article in Example 23 broke and peeled off over 8 hours.

EXAMPLES 24 to 32

0.01 mole of polyoxytetramethyleneglycol having an average molecular weight of 2,000, 0.49 mole of pentamethyleneglycol, 0.10 mole of muconic acid and 0.40 mole of glutaric acid were polycondensed in the same manner as in Example 1 to produce an unsaturated polyester having an average molecular weight of 18,000 and an ethylenic double bond concentration of $1 \times 10^{-3}$ mole/gram. To 100 parts of the unsaturated polyester thus obtained, there were added a desired amount of a variety of ethylenically unsaturated compounds shown in Table III and 2 parts of benzoin to produce photopolymerizable compositions. Each resulting photopolymerizable composition was exposed for 20 minutes to 60 W. fluorescent lamps at a distance of 10 cm. and tensile strength, elongation and transparency were measured. The results are shown in Table III. Using each resulting photopolymerizable composition, a laminated safety glass having an interlayer of 0.30 mm. in thickness was produced in the same manner as in Example 1. All the laminated safety glasses stood the tests according to JIS R 3205, i.e. Appearance, Projection, Warping, Ultraviolet ray irradiation, Boiling and Impact Tests.

Table II

| Example No. | Ethylenically unsaturated compound (Parts for weight) | | Tensile strength[1] | Elongation[2] | Transparency[3] |
|---|---|---|---|---|---|
| 15 | Acrylic acid | 60 | C | C | Transparent |
| 16 | Methyl methacrylate | 100 | C | C | do. |
| 17 | N-methylolacrylamide | 50 | C | B | do. |
| 18 | 2-ethylhexylmethacrylate | 100 | A | D | do. |
| 19 | Butylacrylate | 100 | A | D | do. |
| 20 | Diethyleneglycol diacrylate | 100 | B | D | do. |
| 21 | Styrene | 100 | B | C | do. |
| 22 | Diallylphthalate | 100 | B | C | do. |
| 23 | Vinyl acetate | 100 | A | A | Translucent |

Conditions of measurement
[1] Tensile strength: The same as in Examples 2 to 14.
[2] Elongation: do.
[3] Transparency: Judged with the unaided eye.

Table III

| Example No. | Ethylenically unsaturated compound (Parts by weight) | | Tensile strength[1] | Elongation[2] | Transparency[3] |
|---|---|---|---|---|---|
| 24 | Acrylic acid | 30 | | | |
| | Acrylamide | 30 | D | B | Transparent |
| 25 | Methylacrylic acid | 40 | | | |
| | N,N'-bismethylene acrylamide | 20 | D | B | Translucent |
| 26 | Methyl methacrylate | 60 | | | |
| | N-dimethylacrylamide | 40 | D | C | Transparent |
| 27 | Acrylic acid | 50 | | | |
| | Ethylacrylate | 50 | C | D | do. |
| 28 | Methacrylic acid | 50 | | | |
| | Tetraethyleneglycol dimethylacrylate | 40 | C | C | do. |
| 29 | Methyl methacrylate | 50 | | | |
| | Glycidyl methacrylate | 50 | C | D | do. |
| 30 | Acrylic acid | 50 | | | |
| | Styrene | 30 | D | C | do. |
| 31 | Methyl methacrylate | 50 | | | |
| | Vinyltoluene | 30 | C | C | do. |
| 32 | Alpha-chloroacrylic acid | 50 | | | |
| | Diallylphthalate | 30 | C | C | Transparent |

Conditions of measurement
[1] Tensile Strength: The same as in Examples 2 to 14.
[2] Elongation: do.
[3] Transparency: The same as in Examples 15 to 23.

EXAMPLES 22 to 38

0.005 mole of trimethylolpropanepolyoxypropylethertriol having an average molecular weight of 4,000, 0.195 mole of trioxypropyleneglycol, 0.300 mole of dioxyethyleneglycol, 0.10 mole of citraconic acid and 0.40 mole of adipic acid were polycondensed in the same manner as in Example 1 to produce an unsaturated polyester having an average molecular weight of 25,000 and an ethylenic double bond concentration of $6 \times 10^{-4}$ mole/gram. To 100 parts of the unsaturated polyester thus obtained, there were added a desired amount of a variety of ethylenically unsaturated compounds shown in Table IV and 2 parts of benzoin to produce photopolymerizable compositions. Each resulting composition was exposed for 20 minutes to 60 W. fluorescent lamps at a distance of 10 cm. and then a tensile strength, an elongation and a transparency were measured. The results are shown in Table IV.

A spacer of 0.75 mm. in thickness having an inlet for introducing the photopolymerizable composition and an air outlet was inserted between 2 transparent glass sheets of 3 mm. in thickness, respectively and each resulting photopolymerizable composition was charged from the inlet. One side of the transparent glass sheet was exposed at room temperature for 10 minutes to a 3 KW. 3-core carbon arc lamp to give a laminated safety glass. All the laminated safety glasses stood Penetration Resistance Test, ASA Z26-1-1966 by dropping a steel ball of 5 pounds from the height of 12 feet and a quantity of glass fragments separated from the laminated safety glasses was very small. These laminated safety glasses maintained the 5 pound steel ball in Penetration Resistance Test at temperatures of −20° C., 0° C., 20° C., and 50° C. and accordingly the temperature dependency of the laminated safety glasses was extremely low.

duce an unsaturated polyester having an average molecular weight of 12,000 and an ethylenic double bond concentration of $5 \times 10^{-4}$ mole/gram. To 100 parts of the unsaturated polyester thus obtained, there were added 20 parts of acrylic acid, 20 parts of N-allylacrylamide, 20 parts of furfurylmethacrylate, 20 parts of styrene, 2 parts of benzophenone and 0.1 part of tert-butylcatechol and these were thoroughly mixed to give a photopolymerizable composition. The resulting composition was photopolymerized in the same manner as in Example 1 to produce an unsaturated polyester having an average molecular weight of 12,000 and an ethylenic double bond concentration of $5 \times 10^{-4}$ mole/gram. To 100 parts of the unsaturated polyester thus obtained there were added 20 parts of acrylic acid, 20 parts of N-allylacrylamide, 20 parts of furfurylmethacrylate, 20 parts of styrene, 2 parts of benzophene and 0.1 part of tert.-butylcatechol and these were thoroughly mixed to produce a photopolymerizable composition. The resulting photopolymerizable composition was exposed for 10 minutes to 60 W. fluorescent lamps at a distance of 10 cm. and a tensile strength and an elongation of the photopolymerized article were C and D respectively, according to the same measuring method as in Examples 2 to 14.

Using the resulting photopolymerizable composition as interlayer and a variety of adherents, there were produced the laminated articles in Table V. The temperature of one side of the laminated article thus produced was constantly maintained at 0° C. while that of the other side was maintained reciprocally at 0° C. and at 60°. in a period of 2 hours. This test was continued for 100 hours. All the laminated articles did not break and the interlayers did not peel off. Also this test was carried out in caparison with the laminated articles produced from the same photopolymerizable composition as in Example 2 and the glass of those laminated articles broke over 10 hours and the interlayers of those laminated articles using the plastics as adherent peeled off. The plastic laminated articles of Example 39 could be satisfactorily used as building materials such as doors.

Table IV

| Example No. | Ethylenically unsaturate compound (Parts by weight) | | Tensile strength[1] | Elongation[2] | Transparency[3] |
|---|---|---|---|---|---|
| 33 | Methacrylic acid | 25 | | | |
| | Acrylamide | 25 | D | C | Transparent |
| | Styrene | 25 | | | |
| 34 | Acrylic acid | 30 | | | |
| | Butylacrylate | 20 | D | D | do. |
| | Diallylphthalate | 20 | | | |
| 35 | Methylmethacrylate | 40 | | | |
| | N-isopropylacrylamide | 10 | C | D | do. |
| | 2-hydroxyethylmethacrylate | 30 | | | |
| 36 | Alpha-chloroacrylic acid | 20 | | | |
| | N-cyclohexylacrylamide | 20 | D | D | do. |
| | Ethylacrylate | 20 | | | |
| | Monoallylphthalate | 20 | | | |
| 37 | Acrylic acid | 20 | | | |
| | N,N'-trimethylenebisacrylamide | 20 | D | C | do. |
| | Ethylacrylate | 10 | | | |
| | Vinyltoluene | 10 | | | |
| 38 | Methylmethacrylate | 50 | | | |
| | Methacrylamide | 10 | D | D | do. |
| | Butylacrylate | 10 | | | |
| | Styrene | 10 | | | |

Conditions of measurement
[1] Tensile strength: The same as in Examples 2 to 14.
[2] Elongation: do.
[3] Transparency: The same as in Examples 15 to 23.

EXAMPLES 39

0.25 mole of polyoxypropyleneglycol having an average molecular weight of 300, 0.50 mole of ethyleneglycol, 0.09 mole of maleic acid, 0.41 mole of succinic acid and 0.25 mole of phthalic anhydride were polycondensed in the same manner as in Example 1 to pro- Table V

| Adherend[1] (mm. in thickness) | [2] | Adherend[1] (mm. in thickness) | [2] | Adherend[1] (mm. in thickness) | [2] | Adherend[1] (mm. in thickness) |
|---|---|---|---|---|---|---|
| Glass[2] | | Polymethylmethacrylate (8) | | Glass[2] | — | — |
| do. | | Polyvinylchloride (8) | | do. | — | — |
| do. | | Polystyrene (8) | | do. | — | — |
| do. | | Polyamide (5) | | do. | — | — |
| do. | | Aluminium (0.5) | | do. | — | — |
| Glass[2] | | Magnesium (0.5) | — | — | — | — |
| do. | | Asbestos (5) | — | — | — | — |
| do. | | Marble (5) | — | — | — | — |
| do. | | Wood (5) | — | — | — | — |
| Polyvinylchloridie[2] | | Duralmin (0.5) | — | — | — | — |
| Polymethylmethacrylate[2] | | Tin (0.5) | — | — | — | — |
| Glass[2] | | Polymethylmethacrylate [2] | | Polymethylmethacrylate[2] | | Glass[2] |
| do. | | Polyvinylchloride[2] | | Polyvinylchloride[2] | | do. |

[1]Adherend of 1 m. (length) × 1 m. (width)
[2]Interlayer of 0.5 mm.

EXAMPLES 40 to 43

To 100 parts of the same unsaturated polyester as in Example 15 there were added a desired amount of a variety of ethylenically unsaturated compounds shown in Table VI and two parts of benzoin to produce photopolymerizable compositions. Each resulting composition was exposed for 10 minutes to a 3 KW. three-core carbon arc lamp at a distance of 75 cm. and then tensile strength, elongation and transparency were measured. The results are shown in Table VI.

Using each resulting photopolymerizable composition, a laminated safety glass having an interlayer of 0.75 mm. was prepared in the same manner as in Example 1. All laminated safety glasses passed the tests according to ASA Z 26-1-1966, i.e. Light Stability, Luminous Transmittance Humidity, Boil, Impact, Deviation and Distortion, Abrasion Resistance and Penetration Resistance Tests.

Table VI

| Example No. | Ethylenically unsaturated compound (Parts by weight) | | Tensile strength[1] | Elongation[2] | Transparency[3] |
|---|---|---|---|---|---|
| 40 | Arcylic acid<br>Butylacrylate<br>Styrene<br>Allylacetate | 30<br>10<br>10<br>20 | D | D | Transparent |
| 41 | Methacrylic acid<br>Acrylamide<br>Diallylphthalate<br>Methylacrylate<br>Vinylacetate | 20<br>10<br>10<br>10<br>10 | do. | do. | do. |
| 42 | Chloroacrylic acid<br>Ethylacrylate<br>Dimethylmaleate<br>Styrene | 20<br>10<br>20<br>05 | do. | do. | do. |
| 43 | Methylmethacrylate<br>N-methylolacrylamide<br>Methylacrylate<br>Monoallylphthalate | 40<br>10<br>10<br>10 | do. | do. | do. |

Conditions of measurement
1) Tensile strength : The same as in Examples 2 to 14.
2) Elongation : do.
3) Transparency : The same as in Example 15 to 23.

EXAMPLE 44

On a glass sheet having a dimension of 2 m. (length) x 1 m. (width) × 2 mm. (thickness) there was placed a spacer of 0.4 mm. in thickness and the same photopolymerizable composition as in Example 30 was poured thereto. Then a cellophane sheet bearing a printed pattern for stained glass was buried therein and another glass sheet having the same dimension was placed on the spacer. Both sides of the glass sheets were exposed at room temperature for 10 minutes to a 3 KW. three-core carbon arc lamp at a distance of 75 cm. to readily and easily give a cheap and safety stained glass.

What is claimed is:

1. A photopolymerizable composition comprising:

I an ethylenically unsaturated polyester polymer having a number average molecular weight of about 1,500 to 50,000 and having an ethylenic double bond concentration of $2 \times 10^{-3}$ to $2 \times 10^{-4}$, containing in the molecule at least one weight percent of a segment, measured between two adjacent ester bonds, having a number average molecular weight of about 80 to 5,000, II. about 10 to 80 weight percent, based upon the total weight of the composition, of at least one ethylenically unsaturated monomer, which monomer is addition-copolymerizable with said polyester; and III. about 0.001 to 10 weight percent of a photopolymerization initiator.

2. A composition as claimed in claim 1 which additionally contains about 0.005 to 3 weight percent of a stabilizer.

3. A composition as claimed in claim 1, wherein said ethylenically unsaturated monomer comprises at least one compound selected from the group consisting of:

A. a compound selected from the group consisting of:

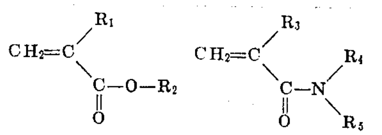

and

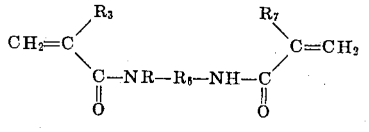

wherein $R_1$ is a member selected from the group consisting of hydrogen, chlorine and methyl, $R_2$, $R_3$ and $R_7$ are each selected from the group consisting of hydrogen and methyl, wherein when $R_2$ is hydrogen, $R_1$ is also hydrogen, $R_4$ is one member selected from the group consisting of hydrogen, methyl and ethyl, $R_5$ is a member selected from the group consisting of hydrogen, a $-C_mH_{2m+1}$ group, wherein $m$ is an integer of 1 to 6, a cyclohexyl group, a $-(CH_2)_n-OH$ 175 group, wherein $n$ is an integer of 1 to 5, a $-(CH_2)_p-O-C_qH_{2q+1}$group, wherein $p$ is an integer of 1 to 5, and a $-CH_2-CH{=}CH_2$ group, and wherein $R_6$ is a $-(CH_2)_r-$ group, wherein $r$ is an integer of 1 to 10;

B. at least one compound selected from the group consisting of:

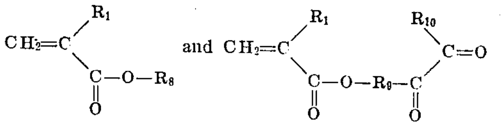

wherein $R_1$ and $R_{10}$ each are a member selected from the group consisting of hydrogen, chlorine and methyl; $R_8$ is a member selected from the group consisting of a $-C_sH_{2s+1}$ group, wherein $s$ is an integer of 2 to 15, a

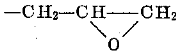

group, a

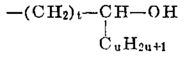

group, wherein $t$ is an integer of 1 to 2 and $u$ is an integer of 1 to 5, a

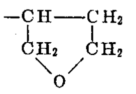

groups, a $-CH_2-CH{=}CH_2$ group and a $-(CH_2-CH_2-O)_v-H$ group, wherein $v$ is an integer of 1 to 15, wherein $R_2$ is hydrogen, $R_8$ is methyl; and wherein $R_9$ is a $-(CH_2-CH_2-O)w-$ group, wherein $w$ is an integer of 1 to 15;

C. an aromatic compound having at least one vinyl group attached to a benzene nucleus; and D. at least one other ethylenically unsaturated compound selected from the group consisting of 1,3-butadiene, 2-chlorobutadiene, 2-methyl-butadiene, allyalcohol, allylacetate, vinylacetate, vinylpropionate, maleic acid, fumaric acid, itaconic acid, dimethyl maleate, diethyl maleate, dimethyl fumarate, diethyl fumarate, dimethyl itaconate, diethyl itaconate, cinnamic acid, ethylvinylether, propylvinylether, methylvinylketone, acrolein, vinylidene chloride, vinylpyridine, vinylpyrrolidone, diethylvinylamine, vinylcarbazole and triallylcyanurate.

4. A composition as claimed in claim 3, wherein said (A) compound is present in a proportion of at least 5 weight percent of the total weight of ethylenically unsaturated monomer.

5. A composition as claimed in claim 3, wherein said (B) compound is present in a proportion of at least 5 weight percent of the total weight of ethylenically unsaturated monomer.

6. A composition as claimed in claim 3, wherein said (C) compound is present in a proportion of at least 1 weight percent of the total weight of ethylenically unsaturated monomer.

7. A composition as claimed in claim 3, wherein said (A) compound is acrylic acid.

8. A composition as claimed in claim 3, wherein said (A) compound is acrylamide.

9. A composition as claimed in claim 3, wherein said (B) compound is methylacrylate.

10. A composition as claimed in claim 3, wherein said (B) compound is butylacrylate.

11. A composition as claimed in claim 3, wherein said (C) compound is styrene.

12. A composition as claimed in claim 3, wherein said (C) compound is diallylphthalate.

13. A composition as claimed in claim 3, wherein said ethylenically unsaturated monomer contains at least one compound (A) and at least one compound (B), wherein said compound (B) is present in an amount up to about 90 weight percent based upon the total weight of said ethylenically unsaturated monomer compound.

14. A composition as claimed in claim 3, wherein said ethylenically unsaturated monomer contains at least one compound (A) and at least one compound (C), wherein said compound (C) is present in an amount up to about 90 weight percent based upon the total weight of said ethylenically unsaturated monomer compound.

15. A composition as claimed in claim 3, wherein said ethylenically unsaturated monomer contains at least one compound (B) and at least one compound (C), wherein said compound (C) is present in an amount up to about 90 weight percent based upon the total weight of said ethylenically unsaturated monomer compound.

16. A composition as claimed in claim 3, wherein said ethylenically unsaturated monomer contains at least one compound (A), at least one compound (B) and at least one compound (C), wherein said compound (C) is present in an amount up to about 80 weight percent based upon the total weight of said ethylenically unsaturated monomer compound.

17. A composition as claimed in claim 1, wherein said segment is an alkylene group.

18. A composition as claimed in claim 1, wherein said segment is an oxyalkylene group.

* * * * * l050
69)

UNITED STATES PATENT OFFICE

CERTIFICATE OF CORRECTION tent No. 3,839,171 Dated October 1, 1974 ventor(s) KIYOSHI AKAMATSU, TAKEAKI HAGIHARA, TERUHISA ISHIDO

It is certified that error appears in the above-identified patent d that said Letters Patent are hereby corrected as shown below:

54] In the title, insert -- PHOTOPOLYMERIZABLE--before "UNSATUR- TED".

76] Asahi Kasei Kogyo Kabushiki Kaisha should be designated as ssignee; delete "03,".

olumn 1, line 20, "voltatile" should read -- volatile --.
olumn 4, line 20, after "before" insert -- photopolymerization--; ine 44, in the formula, change "j=1" (second occurrence) to -- =1; line 63, "$CH_2O)_m$" should read -- $CH_2$-$O)_m$ --.
Column 5, line 49, "nsaturated" should read -- unsaturated --; 'olyester" should read -- polyester --.
Column 10, line 27, "handed: should read -- bonded --.
Column 11, line 20, "6 W." should read -- 60 W. --.
Column 19, line 66, (claim 3) "groups" should read -- group --.

Signed and sealed this 3rd day of December 1974.

(SEAL)
Attest:

McCOY M. GIBSON JR.
Attesting Officer

C. MARSHALL DANN
Commissioner of Patents